US00RE44715E

(19) United States
(12) Reissued Patent
Speight et al.

(10) Patent Number: US RE44,715 E
(45) Date of Reissued Patent: Jan. 21, 2014

(54) METHOD AND ARRANGEMENT FOR TCP FLOW CONTROL

(75) Inventors: Timothy J. Speight, Bristol (GB); Nicholas Jelbert, Bath (GB)

(73) Assignee: Sony Corporation, Tokyo (JP)

(21) Appl. No.: 13/272,959

(22) Filed: Oct. 13, 2011

Related U.S. Patent Documents

Reissue of:
(64) Patent No.: 7,602,719
Issued: Oct. 13, 2009
Appl. No.: 10/561,726
PCT Filed: Jun. 25, 2004
PCT No.: PCT/GB2004/002728
§ 371 (c)(1),
(2), (4) Date: Jun. 8, 2006
PCT Pub. No.: WO2005/002148
PCT Pub. Date: Jan. 6, 2005

(30) Foreign Application Priority Data

Jun. 27, 2003 (GB) ..... 0315009.1

(51) Int. Cl.
*H04L 12/26* (2006.01)

(52) U.S. Cl.
USPC ..... 370/235; 370/252; 370/519

(58) Field of Classification Search
USPC ..... 370/230, 230.1, 231–236, 236.1, 370/237–238, 252, 395.21, 516–517, 519
See application file for complete search history.

(56) References Cited

U.S. PATENT DOCUMENTS 5,748,901 A * 5/1998 Afek et al. ..... 709/238
6,310,857 B1 * 10/2001 Duffield et al. ..... 370/232
6,370,114 B1 4/2002 Gullicksen et al.
6,535,515 B1 3/2003 Hasegawa et al.
6,831,912 B1 12/2004 Sherman
6,901,593 B2 5/2005 Aweya et al.
6,965,943 B1 * 11/2005 Golestani ..... 709/235
7,054,317 B1 5/2006 Jung et al.
2002/0199008 A1 12/2002 Pecen et al.
2003/0174700 A1 9/2003 Ofek et al.
2004/0015591 A1 1/2004 Wang
2004/0052234 A1 3/2004 Ameigeiras et al.
2004/0071086 A1 4/2004 Haumont et al.
2005/0005024 A1 1/2005 Samuels et al.

(Continued)

FOREIGN PATENT DOCUMENTS

JP 1 0023064 A2 1/1998
WO WO-02/84920 A2 10/2001
WO WO-2002/084920 A2 10/2002

OTHER PUBLICATIONS

"3rd Generation Partnership Project; Technical Specification Group Radio Access Network; UTRAN Overall Description (Release 6)," (Sep. 2005). 3GPP:Valbonne, France, TS 25.401 v6. 7.0: 1-48.

(Continued)

*Primary Examiner* — Kevin Mew
(74) *Attorney, Agent, or Firm* — Oblon, Spivak, McClelland, Maier & Neustadt, L.L.P.

(57) ABSTRACT

An apparatus, method, and computer-readable medium encoded with executable instructions for Transmission Control Protocol (TCP) flow control in a communication system are provided. According to embodiments of the invention. TCP flow control includes determining delay in a transmit buffer of the system; and modifying TCP window size based on the determined delay and a target transmit buffer delay. An indication of a modified TCP window size is sent to a TCP server of the system in an acknowledge packet. Embodiments of the invention are particularly suitable for TCP flow control in wireless communication systems (e.g., UTRA) systems, and has the advantage that RTT (i.e., the latency of the system) can be substantially guaranteed, irrespective of the throughput that a user is allocated.

28 Claims, 3 Drawing Sheets

(56) References Cited

U.S. PATENT DOCUMENTS

| | | | |
|---|---|---|---|
| 2005/0141419 | A1 | 6/2005 | Bergamasco et al. |
| 2005/0255850 | A1 | 11/2005 | Auterinen |
| 2007/0081561 | A1 | 4/2007 | Heninger et al. |
| 2007/0248005 | A1 | 10/2007 | Pan et al. |
| 2007/0280111 | A1 | 12/2007 | Lund |

OTHER PUBLICATIONS

"3rd Generation Partnership Project; Technical Specification Group Services and System Aspects; General Packet Radio Service (GPRS); Service Description; Stage 2 (Release 6)," (Mar. 2006). 3GPP: Valbonne, France, TS 23.060 v6.12.0:1-212.

"3rd Generation Partnership Project; Technical Specification Group Radio Access Network; Radio Link Control (RLC) Protocol Specification (Release 6)," (Mar. 2006). 3GPP:Valbonne, France, TS 25.322 v6.7.0:1-86.

"3rd Generation Partnership Project; Technical Specification Group Radio Access Network; Packet Data Convergence Protocol (PDCP) Specification (Release 6)," (Mar. 2006). 3GPP: Valbonne, France TS 25.323 v6.5.0:1.-35.

"3rdGeneration Partnership Project; Technical Specification Group Radio Access Network; Medium Access Control (MAC) Protocol Specification (Release 6)," (Mar. 2006). 3GPP:Valbonne, France, TS 25.321 v6.8.0:1-91.

"3rd Generation Partnership Project; Technical Specification Group Terminals; Common Test Environments for User Equipment (UE) Conformance Testing (Release 5)," (Mar. 2005). 3GPP: Valbonne, France, T8 34.108 v5.4.0:1-777.

Bakre and Badrinth. (1995). "I-TCP: Indirect TCP for Mobile Hosts," Proceedings of the 15th International Conference on Distributed Computer Systems.

Igarashi, K. et al. "Mobility Aware TCP Congestion Control," IEEE 2: 338-342.

Jiang, H et al. (2001). "TCP Reno and Vegas Performance in Wireless ad hoc Networks," IEEE International Conference on Communications: Helsinky, Finland, Jun. 11-14. 1: 132-136.

Koga et al. (2002). "TCP Flow Control Using Link Layer Information in Mobile Networks," Proceedings of SPIE Conference of Internet Performance and Control of Network Systems II: Boston, Massachusetts.

Seok et al. (2001). "A-TCP: A Mechanism for Improving TSP Performance in Wireless Environments," IEEE Broadband Wireless Summit.

Stevens, W. R. (1994). TCP/IP Illustrated, vol. I: The Protocol. Addison-Wesley: Reading, Massachusetts.

"3rd Generation Partnership Project; Technical Specification Group Radio Access Network; UTRAN Overall Description (Release 6)," (Sep. 2005). 3GPP: Valbonne, France, TS 25.401 V6.7.0: 1-48.

"3rd Generation Partnership Project; Technical Specification Group Services and System Aspects; General Packet Radio Service (GPRS); Service Description; Stage 2 (Release 6)," (Mar. 2006). 3GPP:Valbonne, France, TS 23.060 v6.12.0:1-212.

* cited by examiner

100

METHOD AND ARRANGEMENT FOR TCP FLOW CONTROL

Matter enclosed in heavy brackets [ ] appears in the original patent but forms no part of this reissue specification; matter printed in italics indicates the additions made by reissue.

CROSS-REFERENCE TO RELATED APPLICATIONS

This application is a National Phase filing under 35 U.S.C. 371 of International Application No. PCT/GB2004/002728 filed on Jun. 25, 2004, and which claims priority to Great Britain Patent Application No. 0315009.1 filed on Jun. 27, 2003, the contents of each of which are incorporated herein by reference in their entirety.

FIELD OF THE INVENTION

This invention relates to TCP (Transmission Control Protocol) flow control, and particularly (though not exclusively) to TCP flow control in wireless communication systems.

BACKGROUND OF THE INVENTION

TCP is a transport protocol in the internet protocol suite (see for example, the publication by W. R. Stevens, 'TCP/IP illustrated, Volume 1: The protocols', Addison-Wesley, Reading, Mass., November 1994). It is used in applications such as telnet FTP (File Transfer Protocol) and HTTP (HyperText Transfer Protocol). TCP is designed for wire networks which have very low error rates.

Flow control in TCP is governed by two windows: the sender's congestion window ('cwnd') and the receiver's advertised window ('awnd'). Flow control is based on the minimum of these 2 windows. The 'cwnd' is modified dynamically to match the capacity in the network. Most importantly it is reduced whenever packets are lost as this is an indication of congestion in the network. The 'awnd' is based on the receiver's ability to buffer data that it receives and it can be dynamically reduced if the receiver is unable to cope with the rate of reception of data. The initial value of 'awnd' is controlled by parameters configured in the TCP protocol stack.

As mentioned above, TCP is designed for low error rate networks. Therefore any packet losses which occur in TCP are regarded as due to network congestion and are therefore followed by a reduction in 'cwnd' and consequently in the data rate of the sender as mentioned above. However, this is not appropriate to wireless networks which are inherently high error rate systems. Therefore, the 3GPP (3rd Generation Partnership Project) standard provides ARQ (Automatic Repeat Request) functionality, known as RLC (Radio Link Control—see, for example, the 3GPP technical specification 3GPP TS 25.322) that allows packets to be re-transmitted which have been subjected to error due to transmission over the air interface. However, the use of ARQ schemes result in the packets arriving out of order, so they have to be buffered before they can be passed on to TCP. The use of buffering introduces increased delay and this can result in increased RTT (Round Trip Time).

Assuming that the highest rate services are provided in the downlink, this means that large buffering is likely to be required in the network node, i.e., the RNC (Radio Network Controller) in the case of 3GPP systems. The following considers this downlink (DL) problem. However the present invention is also appropriate for controlling uplink TCP flows.

The maximum DL rate specified in the 3GPP technical specification 3GPP TS 34.108 is 2 Mbps. Assuming that it is not possible to alter the TCP protocol stack at the receiver (i.e., UE), it is therefore necessary that the UE must advertise a window at least equal to the bandwidth delay product appropriate for the 2 Mbps service. If the UE is to support the maximum rate of 2 Mbps then the advertised window must be extremely large. If a smaller rate is then provided to the UE (due, for example, to the fact that many UE's are requesting service at the same time) then buffer overflow might occur. If buffer overflow does not occur the round trip time (RTT) will be very high since data will spend a long time buffered at the network node.

High RTT will have a negative impact on performance perceived by the user. This is particularly true in the case of the user wishing to continue web browsing while downloading a large file via FTP; the web browsing session will appear to be extremely slow. Therefore we wish to provide a flow control technique to maintain a target RTT for any rate provided by the network while maintaining the ability to download data at rates up to the maximum 2 Mbps rate.

As mentioned previously, flow control is provided by the sender's 'cwnd' and the receiver's 'awnd'. Since control of the sender's 'cwnd' resides in the server, it can be located remotely and is not in any way controllable. It is therefore necessary that flow control is provided by the 'awnd'.

A number of schemes (discussed briefly below) for flow control have been suggested for TCP over 3G wireless systems. However, the issue with which these are most concerned is preventing the buffer at the network node from overflowing (i.e., the sending node in the case of data download).

In the publication by Koga, Kawahara and Oie, "TCP flow control using link layer information in mobile networks", Proceedings of SPIE Conference of Internet Performance and Control of Network Systems III, Boston, Mass. 7, 2002, it is proposed that the receiver, i.e., the UE in the most likely case of file download, modifies the TCP window that it advertises based not on the capacity of the receivers buffers as is conventionally the case but on measures obtained from the RLC. This approach is extremely problematic since it means modification of the TCP protocol stack at the UE and it may not be possible to obtain control of this stack. This is particularly true in the case where a PC (Personal Computer) is connected to a UE (which acts effectively as a modem) and the TCP protocol stack resides in the PC.

The publication by Seok, Joo and Kang, "A-TCP: A mechanism for improving TCP performance in wireless environments", IEEE broadband wireless summit, May 2001 suggests a scheme whereby two entirely split connections are made, one between the server and the network node and another between the network node and the UE. This requires considerable additional complexity and may not be of any benefit for transfers using UDP (User Datagram Protocol).

The publication by Bakre and Badrinth, "I-TCP: indirect TCP for mobile hosts", Proceedings of the 15th International conference on distributed computer systems, May 1995, suggests modifying the TCP window size in TCP ACKs (ACKnowledge packets). However in this publication the goal is simply to modify the TCP window size to the available buffer size at the network node. Limiting the buffer occupancy as in this publication does not guarantee a specified RTT.

A need therefore exists for method and arrangement for TCP flow control wherein the abovementioned disadvantage(s) may be alleviated.

SUMMARY OF THE INVENTION

In accordance with a first aspect of the present invention there is provided an arrangement for TCP flow control as claimed in claim 1.

In accordance with a second aspect of the present invention there is provided a method for TCP flow control as claimed in claim 15.

BRIEF DESCRIPTION OF THE DRAWINGS

One method and arrangement for TCP flow control incorporating the present invention will now be described, by way of example only, with reference to the accompanying drawing (s), in which.

DESCRIPTION OF EMBODIMENTS OF THE INVENTION PREFERRED EMBODIMENT(S)

Figure 1:
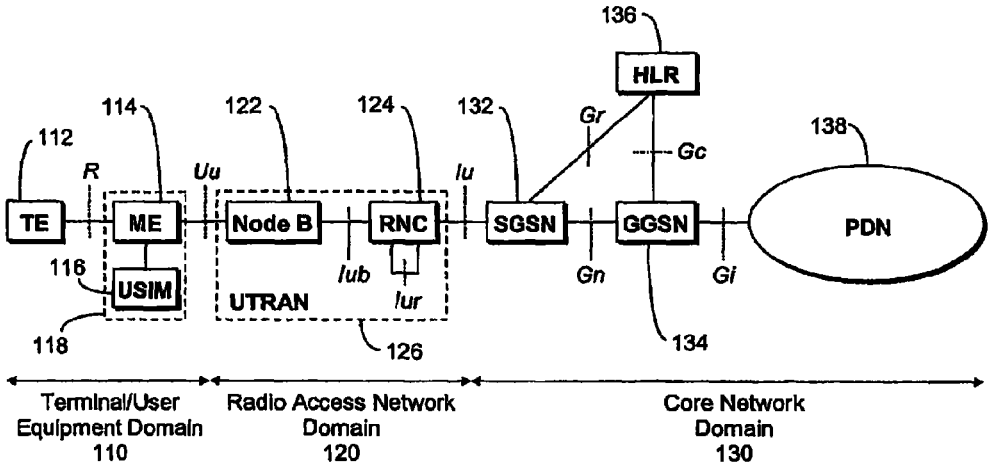
FIG. 1 shows a block schematic diagram illustrating a 3GPP radio communication system in which the present invention may be used.

Embodiments of the present invention will be described in the context of a UMTS Radio Access Network (UTRAN) system operating in TDD mode. Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118. The UE 118 communicates data with a Node B (base station) 122 in the radio access network domain 120 via the wireless Uu interface. Within the radio access network domain 120, the Node B 122 communicates with a radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Figure 2:
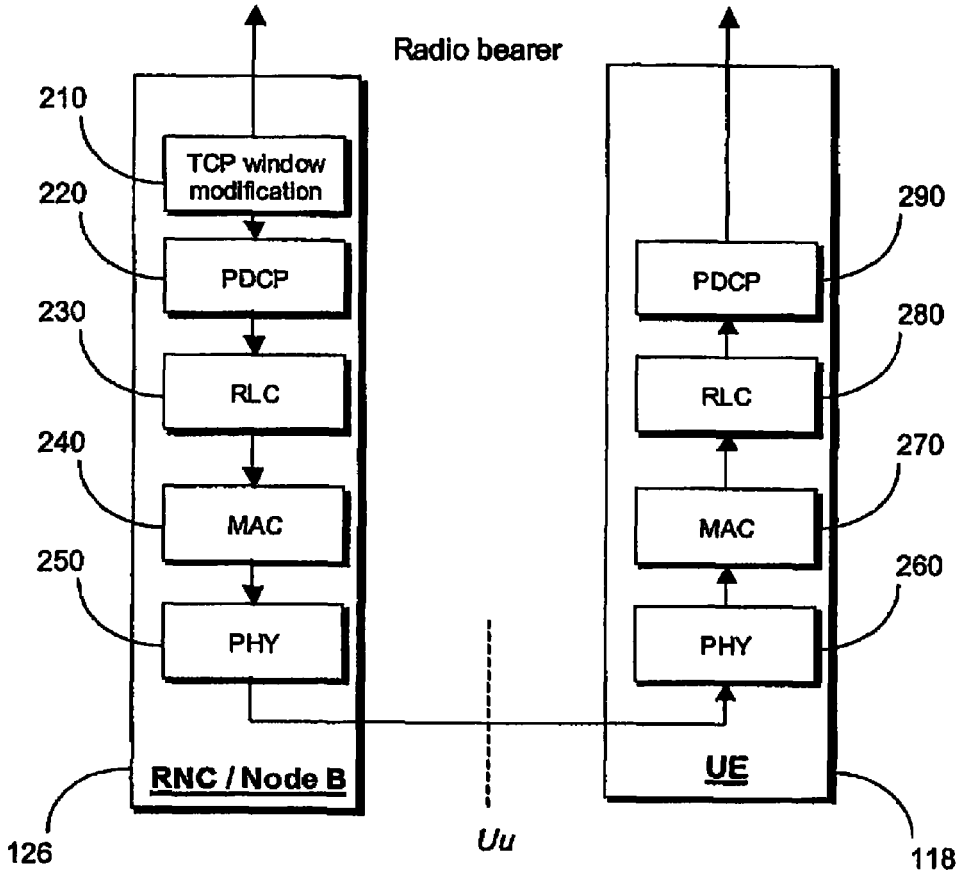
FIG. 2 shows a block schematic diagram illustrating protocol architecture for U-plane showing functional location of a TCP window modification function based on the present invention.

Thus, the elements RNC 124, SGSN 132 and GGSN 134 are conventionally provided as discrete and separate units (on their own respective software/hardware platforms) divided across the radio access network domain 120 and the core network domain 130, as shown the FIG. 2.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface) to support handover and macrodiversity.

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website at www.3gpp.org, and need not be described in more detail herein.

In the present example, all functionality of the invention resides in the RNC 124 but can alternatively be applied at the UE 118.

Referring now to FIG. 2, as will be explained in greater detail below, in order to improve TCP flow for download of data to a UE 118 a modification 210 of the TCP window occurs at the radio bearer level, and is functionally located in the protocol architecture for the user plane (U-plane). In the RNC 124 and Node B 122 of the UTRAN 126 TCP window modification 210 (which will be explained in greater detail below) is followed by PDCP (Packet Data Convergence) processing 220, RLC (Radio Link Control) processing 230, MAC (Medium Access Control) processing 240 and PHY (Physical Layer) processing 250. It will be understood that the PDCP processing 220, RLC processing 230, the MAC processing 240 are performed in accordance with the known 3GPP technical specifications TS 25 323, TS 25 322 and TS 25 321 respectively. PHY processing is described in 3GPP technical specifications TS 25 2xx (e.g., 221, 222, 223, 224 & 225 for TDD). In all cases there is no need to describe these in further detail herein.

The processed information is communicated across the wireless Uu interface to the UE 118, where complementary PHY processing 260, MAC processing 270, RLC processing 280 and PDCP processing 290 are performed. As above, it will be understood that the PDCP processing 290, RLC processing 280, the MAC processing 270, and the PHY processing 260 are performed in accordance with the known 3GPP technical specifications TS 25 323 TS 25 322 and TS 25 321 respectively. PHY processing is described in 3GPP technical specifications TS 25 2xx (e.g., 221, 222, 223, 224 & 225 for TDD). In all cases there is no need to describe these in further detail herein.

Figure 3:
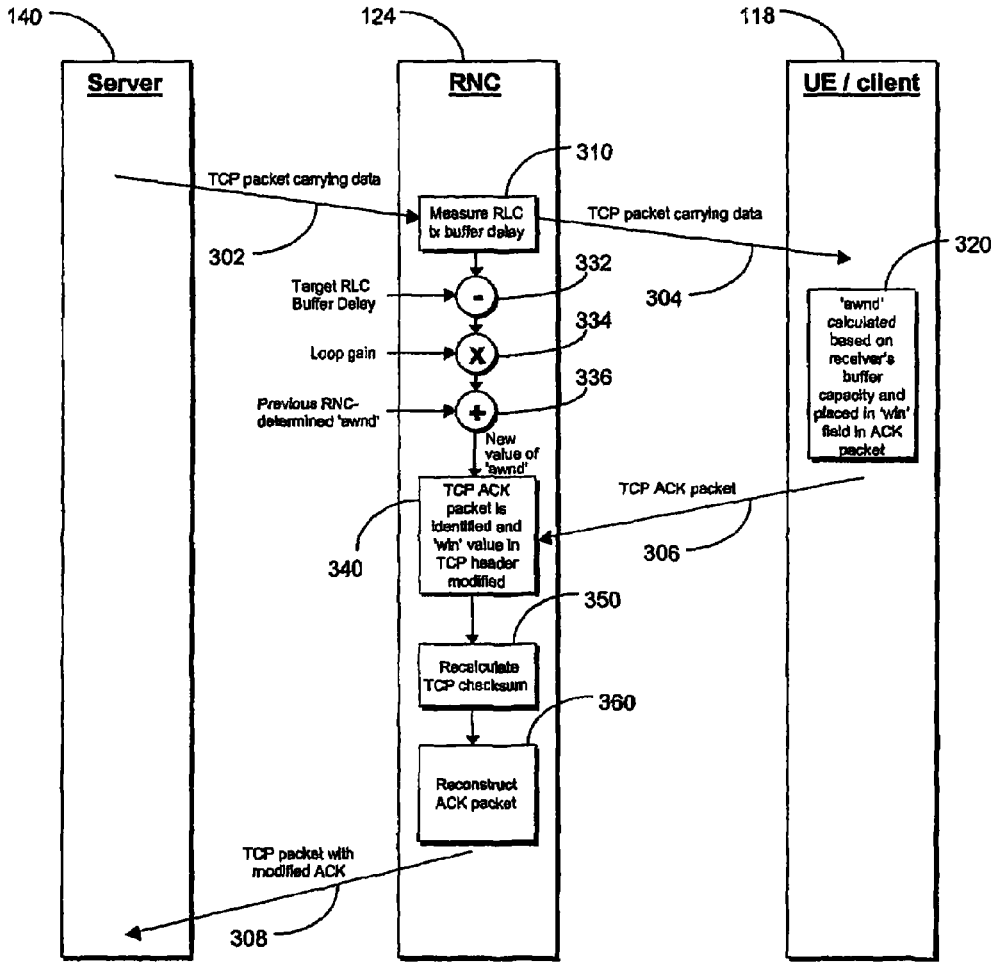
FIG. 3 shows a block schematic diagram illustrating steps performed in the TCP flow control method between a server and a user equipment client terminal via a radio network controller.

Referring now also to FIG. 3, TCP window modification 210 is based on the following steps:

At 310, when a TCP packet (302) carrying data is received at RNC 124 from a server 140 for download to UE 118, a target buffer delay is specified and known, and a measurement of the delay within the transmit buffer of the RLC on downlink traffic is made. A TCP packet (304) carrying data is sent across the wireless Uu interface to the UE 118.

At 320, in the UE 118 an 'awnd' value is calculated based on the UE receiver's buffer capacity and placed in the 'win' field in the ACK (ACKnowledge) packet (306) which is sent back to the RNC 124.

At 332-336, in the RNC 124 a new value of 'awnd' is determined as follows:

at 332, a target RLC buffer delay is subtracted from the RLC buffer delay measured at step 310, at 334, a desired control loop gain multiplier is applied, and at 336, the 'awnd' value previously determined in the RNC 124 is added.

At 340, the next available SDU (Service Data Unit) containing a TCP ACK packet is identified. The 'win' field value in the received ACK packet is compared with the value determined at step 330. If the value determined in step 330 is less than the 'win' value in the received ACK packet then the 'win' value in the packet is replaced with that determined in step 330. However, if the value determined in step 330 is greater than that in the received ACK packet no change is made.

At 350, the TCP checksum is recalculated to take account of the modified TCP ACK.

At 360, the ACK packet is reconstructed and a TCP packet (308) with modified ACK is sent to the server 140.

No more changes to the TCP window are made until all current data in the system has been ACKed (this can be measured conveniently by waiting until the number of ACKs reaches half the current number of SDUs in the system when the delayed ACK function is implemented in the TCP protocol stack).

It will be appreciated that since the RLC buffer delay parameters must be signaled through PDCP, the PDCP protocol layer could be considered a suitable location for this functionality to reside.

It will be understood that ideally it would be desirable to measure overall round trip time (RTT) for a packet and accordingly implement flow control. However, in practice measuring the RTT based on ACK and SEQ numbering can be difficult since there are typically multiple TCP streams at any one moment. The total RTT is made up of the components shown in the following equation:

RTT=sender RLC buffer delay+sender to receiver air interface delay+receiver buffer delay+receiver to sender air interface delay.

The inventors of the present invention have realised that, assuming the volume of data associated with ACKs is low compared to data sent from sender to receiver, the receiver buffer delay can be affected by flow controlling the sender. Also, the time taken over the air interface (although variable due to retransmissions, etc.) can also be regarded as not affected by flow control. Therefore, all that needs to be monitored is the time an SDU spends in the RLC transmit queue.

Also, simply measuring the time to traverse RLC transmit queue may be problematic since even when no new SDUs are added to the back of the queue the traverse time will be high for the last SDU. The following method is therefore conveniently used:

1. For each SDU in the RLC transmit queue, measure:
   a. The current buffer size at the time when the SDU enter the RLC transmit queue.
   b. The time taken from the moment an SDU enters the RLC transmit queue to the moment it leaves the transmit queue (i.e., all PDU which make up the SDU have been sent at least once).
2. Determine the mean of a predetermined number of most recent SDUs for which the buffer size and buffer delay are available.
3. If mean buffer delay is relatively close to (within a predetermined range about) target delay,
   Modify TCP 'awnd' window by an amount related to (target buffer delay—mean buffer delay)*control loop gain as in steps 332-336 of FIG. 3. Note that a 'dead band', centred on desired target delay, may be applied where no adjustment is made.
4. If mean buffer delay is considerably greater than (outside a predetermined range about) target delay,
   Adjust TCP window to the amount indicated by the current mean buffer size minus a predetermined quantity.
5. When a modification to the TCP window size is made no more changes are allowed to TCP window size until this change has taken effect.
6. A minimum allowed calculated window can be configured, so that the determined TCP window size determined in stages 3 and 4 above cannot fall below this value.

It will be appreciated that the process for TCP flow control described above will typically be carried out in software running on a processor (not shown), and that the software may be provided as a computer program element carried on any suitable data carrier (not shown) such as a magnetic or optical computer disc. It will also be appreciated that the TCP flow control scheme described above may alternatively be fabricated in an integrated circuit for use in a terminal or RNC of a communication system.

It will be appreciated that although the TCP flow control scheme has been described above in the context of a downlink data transfer in a UTRA TDD system, the invention is not limited to such an application and may be used in downlink and/or uplink data transfer in communication systems generally.

It will be understood that the method and arrangement for TCP flow control described above provides the advantage that RTT (i.e., the latency of the system) can be substantially guaranteed, irrespective of the throughput that the user is allocated. In comparison, it should be noted that using target buffer occupancy—as in the above-mentioned prior art publication "I-TCP: indirect TCP for mobile hosts"—does not allow the above condition to be met because buffer occupancy varies with throughput for a given RTT.

The invention claimed is:

1. An apparatus for Transmission Control Protocol (TCP) flow control of data from a transmitting end to a receiving end via an intermediate element comprising a transmit buffer in a communication system, the apparatus comprising:

a processor for:

determining delay in the transmit buffer; and modifying *an advertised* TCP window size *associated with the receiving end* based on the determined delay and a target transmit buffer delay.

2. The apparatus of claim 1, wherein the processor for modifying TCP window size comprises sending an indication of modified TCP window size to the transmitting end of the communication system.

3. The apparatus of claim 2, wherein the transmitting end of the communication system is a TCP server.

4. The apparatus of claim 2, wherein the processor for sending an indication of modified TCP window size is configured to send the indication of modified TCP window size in an acknowledge packet.

5. The apparatus of claim 1, wherein the processor for modifying TCP window size modifies the TCP window size as a function of the determined transmit buffer delay and a previously determined TCP window size.

6. The apparatus of claim 1, wherein the processor for modifying TCP window size modifies the TCP window size as a function of the determined transmit buffer delay and a function of control loop gain.

7. The apparatus of claim 1, wherein the processor for modifying TCP window size comprises means for determining a number of received acknowledge packets.

8. The apparatus of claim 7, wherein the processor for modifying TCP window size is configured to further modify TCP window size in response to determining a number of received acknowledge packets [determining a number of acknowledge packets] *is* equal to half of a current number of data units in the system.

9. The apparatus of claim 1, wherein the processor for determining delay in the transmit buffer comprises determining mean buffer delay of a plurality of data units passing through the transmit buffer and modifying TCP window size modifies TCP window size as a function of the mean buffer delay.

10. The apparatus of claim 9, wherein the processor for modifying TCP window size is arranged to modify TCP window size if the mean buffer delay is within a predetermined range about a target delay, by an amount related to a difference between the mean buffer delay and the target delay.

11. The apparatus of claim 9, wherein the processor for modifying TCP window size is arranged to modify TCP window size if the mean buffer delay is outside a predetermined range about a target delay, by an amount related to a difference between a current mean buffer size and a predetermined value.

12. The apparatus of claim 1, wherein the communication system is a wireless communication system and the intermediate element is a network controller of the system.

13. The apparatus of claim 12, wherein the wireless communication system comprises a UTRAN system.

14. A method for Transmission Control Protocol (TCP) flow control of data from a transmitting end to a receiving end via an intermediate element comprising a transmit buffer in a communication system, the method comprising:

determining, by a processor, delay in the transmit buffer; and modifying, by the processor, *an advertised* TCP window size *associated with the receiving end* based on the determined delay and a target transmit buffer delay.

15. The method of claim 14, wherein modifying TCP window size comprises sending an indication of modified TCP window size to a transmitting end of the communication system.

16. The method of claim 15, wherein sending the indication of modified TCP window size is sent in an acknowledge packet.

17. The method of claim 14, wherein modifying TCP window size comprises determining a new TCP window size as a function of the determined transit buffer delay and a previously determined TCP window size.

18. The method of claim 14, wherein modifying TCP window size comprises modifying the TCP window size as a function of the determined transmit buffer delay and a function of control loop gain.

19. The method of claim 14, further comprising determining a number of received acknowledge packets.

20. The method of claim 19, wherein further modifying the TCP window size is performed in response to determining the number of received acknowledge packets is equal to half of a current number of data units in the communication system.

21. The method of claim 14, wherein determining delay in the transmit buffer comprises determining mean buffer delay of a plurality of data units passing through the transmit buffer and modifying TCP window size as a function of the mean buffer delay.

22. The method of claim 21, comprising modifying TCP window size if the mean buffer delay is within a predetermined range about a target delay, by an amount related to a difference between the mean buffer delay and the target delay.

23. The method of claim 21, comprising modifying TCP window size if the mean buffer delay is outside a predetermined range about a target delay, by an amount related to a difference between a current mean buffer size and a predetermined value.

24. The method of claim 14, wherein the intermediate element is a network controller of a wireless communication system.

25. The method of claim 24, wherein the wireless communication system comprises a UTRAN system.

26. A *non-transitory* computer-readable medium encoded with executable instructions that when executed will:

determine delay in [the] *a* transmit buffer; and modify *an advertised* TCP window size *associated with a receiving end* based on the determined delay and a target transmit buffer delay.

27. An integrated circuit comprising the apparatus of claim 1.

*28. A user equipment for providing Transmission Control Protocol (TCP) flow control of data from the user equipment to a base station in a wireless communication system, the user equipment comprising:*

*circuitry configured to:*

*determine delay in a transmit buffer of the user equipment; and*

*modify an advertised TCP window size associated with the base station based on the determined delay and a target transmit buffer delay.*

* * * * *